US011627002B2

(12) United States Patent
Poeppelmann et al.

(10) Patent No.: US 11,627,002 B2
(45) Date of Patent: Apr. 11, 2023

(54) CRYPTOGRAPHIC OPERATION

(71) Applicant: Infineon Technologies AG, Neubiberg (DE)

(72) Inventors: Thomas Poeppelmann, Munich (DE); Rainer Urian, Augsburg (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/316,146

(22) Filed: May 10, 2021

(65) Prior Publication Data
US 2021/0359868 A1    Nov. 18, 2021

(30) Foreign Application Priority Data

May 15, 2020 (DE) .......................... 102020113198.4

(51) Int. Cl.
*H04L 29/06* (2006.01)
*G06F 21/00* (2013.01)
*H04L 9/32* (2006.01)
*H04L 9/08* (2006.01)
*H04L 9/30* (2006.01)

(52) U.S. Cl.
CPC .......... *H04L 9/3271* (2013.01); *H04L 9/0869* (2013.01); *H04L 9/0877* (2013.01); *H04L 9/3093* (2013.01)

(58) Field of Classification Search
CPC ... H04L 9/3271; H04L 9/0869; H04L 9/0877; H04L 9/3093; H04L 9/003; H04L 9/0643; G06F 11/1044; G06F 21/602; G06F 21/64
See application file for complete search history.

(56) References Cited

U.S. PATENT DOCUMENTS

| 9,673,977 | B1* | 6/2017 | Kalach | H04L 9/0816 |
| 9,942,040 | B1* | 4/2018 | Kalach | H04L 9/3093 |
| 10,121,033 | B1* | 11/2018 | Robshaw | G06K 7/10198 |
| 10,965,474 | B1* | 3/2021 | Benson | H04L 9/3271 |
| 2007/0288392 | A1 | 12/2007 | Peng et al. | |
| 2012/0131340 | A1 | 5/2012 | Teuwen et al. | |
| 2012/0180119 | A1* | 7/2012 | Bessis | H04L 9/3271 726/11 |
| 2017/0134444 | A1* | 5/2017 | Buckley | H04L 65/1016 |
| 2020/0202617 | A1 | 6/2020 | Lachinski et al. | |

(Continued)

OTHER PUBLICATIONS

Alkim, Erdem, et al., "NewHope without reconciliation", IACR Cryptology ePrint Archive, https://eprint.iacr.org/2016/1157.pdf, Nov. 8, 2017, pp. 1-9.

(Continued)

*Primary Examiner* — Lisa C Lewis
(74) *Attorney, Agent, or Firm* — Murphy, Bilak & Homiller, PLLC (57) ABSTRACT

A method is suggested for providing a response, wherein the method comprises: obtaining a challenge from a host, determining the response based on the challenge, determining an auxiliary value based on the response or the challenge, providing the auxiliary value to the host, obtaining a random value from the host, checking the validity of the challenge based on the random value, and providing the response to the host only if the challenge is valid. Also, according methods running on the host and system are provided. Further, corresponding devices, hosts and systems are suggested.

9 Claims, 5 Drawing Sheets

(56) References Cited

U.S. PATENT DOCUMENTS

2020/0322131 A1 10/2020 Sundaresan et al.
2021/0243035 A1* 8/2021 Ruane .................. G06F 3/0637

OTHER PUBLICATIONS

Alkim, Erdem, et al., "NewHope: Algorithm Specifications and Supporting Documentation", Version 1.1; https://newhopecrypto.org/data/NewHope_2020_04_10.pdf, Apr. 10, 2020, pp. 1-47.

Lyubashevsky, Vadim, et al., "On Ideal Lattices and Learning With Errors Over Rings", Slides presented at Eurocrypt 2010; https://web.eecs.umich.edu/~cpeikert/pubs/slides-ideal-lwe.pdf, 2010, pp. 1-59.

Lyubashevsky, Vadim, et al., "On Ideal Lattices and Learning with Errors Over Rings", Journal of the ACM, 60(6), https://web.eecs.umich.edu/~cpeikert/pubs/ideal-lwe.pdf, Jun. 25, 2013, pp. 1-34.

Oder, Tobias, et al., "Practical CCA2-Secure and Masked Ring-LWE Implementation", IACR Eprint, https://eprint.iacr.org/2016/1109.pdf, Jan. 23, 2018, pp. 1-33.

Alkim, Erdem, et al., "Post-quantum key exchange—a new hope", Department of Mathemathics, Ege University, Turkey, Aug. 10-12, 2016, 1-34.

* cited by examiner

Fig. 5

CRYPTOGRAPHIC OPERATION

TECHNICAL FIELD

Embodiments of the present invention relate to an approach to conduct a security-relevant communication between a host and a device. The solutions described herein apply to classical cryptosystems as well as post-quantum cryptosystems.

BACKGROUND

Various internet and industry standards use asymmetric cryptography based on RSA or elliptic curve cryptography (ECC) to protect data communication between smart cards, smart phones, computers, servers, or industrial control systems. As an example, with the RSA algorithm a public-key encryption (PKE) scheme can be realized that allows sending an encrypted email (e.g., with PGP/GPG or S/MIME) to a recipient without the need to first exchange a symmetric key via a secure channel. Instead, the public key of the recipient is sufficient to achieve confidentiality.

Other applications of asymmetric cryptography are digital signatures, also based on RSA or ECC. They can be used to sign and verify data and the public key is used to check the validity of a signature.

Together, PKE and digital signatures are both crucial in the Transport Layer Security (TLS) protocol, which is the backbone of secured communication on the Internet and used by browsers, smart phones and IoT (Internet of Things) devices. TLS establishes a secured channel between two devices where communication is encrypted, checked for manipulation, and where the identity of the participants is verified using a digital certificate provided through a public-key infrastructure (PKI). When connecting to a website, e.g., of a bank, using https instead of http, the browser uses TLS. Commonly, a green lock and further information may be displayed to show that the communication is running with the bank's website and that attacks by a so-called man-in-the-middle are prevented. Without such PKI-based identity checks in combination with strong data encryption it would be possible for attackers to manipulate the communication and to impersonate the accessed website.

However, it is known that RSA and ECC-based public keys might be subject to a successful attack using, e.g., quantum computers.

A quantum computer can be described as a computer that makes direct use of quantum-mechanical phenomena to accelerate processing. Crucial concepts to build a quantum computer are so-called quantum-bits or qubits that store a state in a quantum register. Such quantum computers may be used to successfully break cryptographic concepts that were considered sufficiently safe before such processing power was available.

Hence, there is a general motivation to move away from classical asymmetric cryptosystems (RSA/ECC) to schemes which cannot be successfully attacked by quantum computers. As a consequence, new solutions for signature schemes, key exchange, and public-key encryption are required that are not based on the same foundations as RSA and ECC (i.e., the discrete logarithm problem/factoring). This need for new technical solutions has already been acknowledged by standardization bodies like NIST (National Institute of Standards and Technology) investigating alternative cryptosystems.

A cryptosystem may be a cryptographic public key encryption, key exchange, or signature scheme or an advanced scheme like homomorphic encryption or attributed based encryption. In public-key encryption, a non-secret public key is used to encrypt data that can only be decrypted with the associated secret key. In signature schemes, a secret key is used to sign a message and it can be verified with the associated public key that the signer was in possession of the secret key and thus authorized to produce the signature. Key exchange or key establishment is an interactive protocol where two parties establish a secret key that is unknown to a passive or sometimes active adversary or eavesdropper. Also, different options can be used combining public key encryption, key exchange, or signature schemes into protocols like, e.g., Transport Layer Security (TLS).

One class of schemes that is supposed to resist attacks by quantum computers are lattice-based cryptosystems. Lattice-based cryptosystems might become the successor of RSA and ECC and either operate on large matrices (standard lattices) or on polynomial rings (ideal lattices). For lattice-based cryptography, reference is made to, e.g., en.wikipedia.org/wiki/Lattice-based_cryptography.

A lattice is a structure that is created by integer linear combinations of basis vectors. Thus, a lattice can be described as a regular structure in an n dimensional space. Also, a lattice can be perceived as an arrangement of points in a Euclidean space with a regular structure. Given n linearly independent vectors $b_1, \ldots, b_n \in \mathbb{R}^m$, a lattice $\mathcal{L}$ generated by them is defined as $$\mathcal{L}(b_1, \ldots, b_n) = \{\Sigma x_i b_i | x_i \in Z\},$$

wherein $b_1, \ldots, b_n$ is a basis of the lattice and an element from $\mathbb{R}^m$ is a vector with m entries from $\mathbb{R}$.

In the lattice $\mathcal{L}$ (i.e., an n-dimensional space) certain fundamental problems, like finding a short basis or a short vector are conjectured to be computationally hard or at least complex enough to use them for cryptography. Usually, the hardness of breaking a lattice-based cryptosystem can be reduced or related to the hardness of solving such a fundamental problem. Lattice-based cryptography or a lattice-based cryptosystem is a cryptographic system whose security is based on the hardness or related to the hardness of certain mathematically hard problems in lattices.

Lattices may be used to construct cryptosystems. Lattice-based_cryptography is also known with reference to the user-friendly learning with errors (LWE) problem and the ring-LWE (RLWE) problem. In this context a "problem" refers to a mathematical problem (e.g., finding something) that is conjectured to be hard to solve (i.e., no polynomial time algorithm is available) but that also allows the construction of a cryptographic scheme (e.g., like factoring problem for RSA or discrete logarithm for ECC).

In general, to solve an LWE problem, one has to recover a secret vector s over the ring of integer modulo q when given a set of approximate random linear equations on the secret vector s. Hence, the set of linear equations is distorted by a certain amount of randomness, which makes it hard for known algorithms to solve this set of equations.

The LWE and RLWE problems thus allow constructing schemes where the actual lattice structure is not really visible to the designer of a scheme. However, when proving the security of LWE/RLWE based schemes, the lattice structure is used as well when trying to solve the LWE or RLWE problems as lattice algorithms are an efficient way to find the secret vector or polynomial s. This is also described as solving of a "lattice-problem". The RLWE problem works over polynomial rings and supports a security reduction to hard problems on ideal lattices while LWE enables reductions to arbitrary lattices. Ideal lattices carry more structure as not all lattices are ideal lattices but also allow the design of schemes that utilize more practical public-key, ciphertext, and signature lengths.

Prominent examples of lattice-based cryptography are the so-called NTRU and NTRU-sign schemes as well as the so-called GGH (Goldreich-Goldwasser-Halevi, see, e.g., https://en.wikipedia.org/wiki/GGH_encryption_scheme) scheme. For most schemes, the conversion from public key encryption to key exchange is trivial. Additionally, for PKE various security levels like semantic security with respect to adaptive chosen plaintext (CPA) or semantic security with respect to adaptive chosen ciphertext attacks (CCA) can be achieved using standard conversions.

This has exemplarily been shown for the NewHope scheme that can also be instantiated as a CPA-secure or CCA-secure PKE [NewHopeNist17]. The NewHope-Simple and other schemes are a straightforward adaptation of a scheme called LPR10 (see [NewHopeSimplePaperEprint16]). Examples of lattice-based signature schemes are Dilithium, BLISS, GLP12, and qTESLA (see, e.g., https://csrc.nist.gov/Projects/Post-Quantum-Cryptography/Round-1-Submissions).

SUMMARY

The objective is to improve existing solutions and in particular to improve existing validation concepts.

This is solved according to the features of the independent claims. Further embodiments result from the depending claims.

The examples suggested herein may in particular be based on at least one of the following solutions. Combinations of the following features may be utilized to reach a desired result. The features of the method could be combined with any feature(s) of the device, apparatus or system or vice versa.

A method is suggested for providing a response, wherein the method comprises:
  obtaining a challenge from a host,
  determining the response based on the challenge,
  determining an auxiliary value based on the response or the challenge,
  providing the auxiliary value to the host,
  obtaining a random value from the host,
  checking the validity of the challenge based on the random value,
  providing the response to the host only if the challenge is valid.

The random value may comprise at least one of a true-random value, a pseudo-random value or a deterministic feature.

The approach described has the advantage to provide protection against attacks, in particular attacks conducted by quantum computers. Determining the response may include processing a secret key. Such processing is efficient in comparison to existing solution and thus increases the overall performance. This in particular applies if the device running the method has only limited processing capability, which applies for many chips that are attached to consumables.

The solution presented efficiently helps improving protection against side-channel or other attacks.

The method may be run on a device. It is noted that the host and the device determine two different entities. The communication between such entities may comprise a symmetric or an asymmetric communication. As an example, the communication between the host and the device may comprise an authentication, but it is not limited to an authentication or this particular type of communication.

It is also an option that an interaction between two parties may comprise an interactive signature or the interaction may be used to authenticate data.

According to an embodiment, the response is configured such that the host is able to verify the validity of the originator.

According to an embodiment, determining the response and checking the validity of the challenge each utilizes at least one cryptographic Lattice operation.

According to an embodiment, the response is determined based on at least cryptographic operation.

According to an embodiment, the auxiliary value is determined using a one-way function.

According to an embodiment, the auxiliary value is determined based on an additional value (which in an example may be referred to as $\mu$) and wherein the additional value is conveyed to the host.

According to an embodiment, the method is used on a security device or for operating a security device, wherein such security device comprises at least one of the following:
  an integrated circuit,
  a hardware security module,
  a trusted platform module,
  a crypto unit,
  a FPGA,
  a processing unit,
  a controller,
  a smartcard.

Also, a method is suggested for authenticating a device comprising:
  determining a challenge based on a random value,
  providing the challenge to the device,
  obtaining an auxiliary value from the device,
  providing the random value to the device,
  obtaining a response from the device
  authenticating the device if the response corresponds to the auxiliary value.

According to an embodiment, determining the challenge and authenticating the device each utilizes at least one cryptographic Lattice operation.

According to an embodiment, the method further comprises:
  obtaining an additional value ($\mu$) from the device,
  authenticating the device if the response corresponds to the auxiliary value and the additional value.

In addition, a method for authenticating a device to a host is suggested, such method comprising:
  at the host, determining a challenge based on a random value, providing the challenge to the device;
  at the device, obtaining the challenge from the host, determining a response based on the challenge, determining an auxiliary value based on the response or the challenge, and providing the auxiliary value to the host;
  at the host, obtaining the auxiliary value from the device and providing the random value to the device;
  at the device, obtaining the random value from the host, checking the validity of the challenge based on the random value, and providing the response to the host only if the challenge is valid; and
  at the host, obtaining a response from the device, and authenticating the device if the response corresponds to the auxiliary value.

Next, a security device is suggested that is arranged to execute the steps:
obtaining a challenge from a host,
determining the response based on the challenge,
determining an auxiliary value based on the response or the challenge,
providing the auxiliary value to the host,
obtaining a random value from the host,
checking the validity of the challenge based on the random value,
providing the response to the host only if the challenge is valid.

Also, a host is suggested that is arranged to execute the steps:
determining a challenge based on a random value,
providing the challenge to the device,
obtaining an auxiliary value from the device,
providing the random value to the device,
obtaining a response from the device
authenticating the device if the response corresponds to the auxiliary value.

Further, a consumable is described, comprising the security device as described herein.

According to an embodiment, the system comprises at least one security device as described herein.

In addition, a computer program product is provided, which is directly loadable into a memory of a digital processing device, comprising software code portions for performing the steps of the method as described herein.

BRIEF DESCRIPTION OF THE FIGURES

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Technical Challenges Concerning Lattice-Based Cryptography

When realizing lattice-based_cryptography and lattice-based cryptosystems on a computer, a microcontroller, an integrated circuit, in a hardware-software co-design or as fixed circuit, multiple technical challenges arise when performing cryptography operations (e.g., signing, encryption, decryption, verification, key generation). Examples for such technical challenges arising in the field are:

Achieving improved performance by performing steps of a cryptosystem using specifically optimized sequence of operations and by using all features of the available target hardware (special registers or instructions).

Performing a cryptographic operation using a minimal amount of volatile or non-volatile memory.

Realizing a cryptographic operation, or parts thereof, with a minimum amount of logic circuitry and memory cells (e.g., formed by a CMOS process) given a performance target.

Efficient and comprehensive protection against implementation attacks (also referred to as physical attacks, observatory attacks, invasive and semi-invasive attacks).

It is noted that protection against implementation attacks and/or physical attacks is in particular advantageous for cryptosystems that are executed on a security controller or in any adverse environment (e.g., a Hardware Security Module, HSM).

Possible attacks are side-channel attacks where an attacker tries to obtain secret information by observing the physical behavior of a device, like power consumption (e.g., simple or differential power analysis (SPA/DPA)), electric emanation, or temperature. Moreover, fault-attacks are a feasible where an attacker tries to introduce disturbances (e.g., with a laser) in the execution flow or data to obtain secret information or to influence the behavior of the device.

It is a feature of an implementation attack that such attack does not exploit a weakness in the mathematical description of a scheme (which would be considered cryptanalysis), but in the way the scheme is realized on a specific device. In general, the adversary is considered to have access to the device when performing an implementation attack.

Usually, a device like a smart card is constructed in a way that physical effects (e.g., power consumption or radiation) are disguised to make it hard to obtain security critical assets. A common approach to counter physical attacks is an execution on randomized values to prevent invasive and non-invasive attacks that pursue the objective of extracting a secret key or an intermediate value from the device. However, it is a technical challenge to realize such randomizations or redundancy in an efficient way and without opening up further attack opportunities.

Notation and Abbreviations

In the present disclosure, the following notations, abbreviations and references may be used:
q is an integer,
k is an integer,
n is an integer,
mod q is the modulo operation modulo q defined over the integers where the result is in the range $[0, q-1]$,
Z are the integers (number written without a fractional component); for a definition of "number", reference is made to https://en.wikipedia.org/wiki/Number; for a definition of "fractional component", reference is made to https://en.wikipedia.org/wiki/Fraction_(mathematics),
$\mathbb{R}$ are the real numbers (a value of a continuous quantity which may represent a distance along a line),
$Z_q$ is the ring of integers modulo q which is the quotient ring $Z/qZ$ of equivalence classes of integers modulo q
X is an indeterminate,
$f$ is a polynomial of maximum degree of integer n,
$R = Z[X]/(f)$ is a ring of integer polynomials modulo $f$; the elements $v \in Z[X]/(f)$ can be represented by integer polynomials of a degree less than the integer n or alternatively as a vector of coefficients $v \in Z^n$, $R_q = Z_q[X]/(f)$ is a ring of integer polynomials modulo both the polynomial $f$ and the integer q; the elements $v \in Z_q[X]/(f)$ can be represented by integer polynomials of degree less than n with coefficients reduced modulo q or alternatively as a coefficient vector $v \in Z_q^n$, $v \in R_q$ is a polynomial (written in bold) that is an element in $R_q$, v[i] is a coefficient of a vector or polynomial $v \in R_q$ at a position i, $\vartheta$ is an error distribution, $\leftarrow^\$$ random sampling from a set or distribution, $D_{Z,\sigma}$ discrete Gaussian distribution over the integers with standard deviation a, $\psi_k$ binomial distribution with integer parameter k, U( ) uniform distribution, $1001_b$ a number in binary notation, such that $1001_b = 9$, $U(R_{q,k})$ uniformly random sampling of a polynomial in $R_q$ where all coefficients are uniformly random in $[-k, k]$, FFT Fast Fourier Transform, NTT Number Theoretic Transform, DPA Differential Power Analysis, SPA Simple Power Analysis, ALU Arithmetic Logic Unit, PKE Public Key Encryption, KEM Key Encapsulation Mechanism, CCA Chosen Ciphertext Attack, CPA Chosen Plaintext Attack, IND Indistinguishability.

The quotient ring is a construction in abstract algebra; for details, reference is made to, e.g., https://en.wikipedia.org/wiki/Quotient ring.

Ideal Lattices and Polynomial Arithmetic

Currently, there exist two flavors of lattice-based_cryptography, i.e., ideal lattice-based cryptography and standard lattice-based_cryptography. A middle ground is a so-called modular lattice-based_cryptography that mixes concepts from ideal and standard lattices. Reference is made to, e.g., [NewHopeNist17].

The basic operations in ideal lattice-based_cryptography are polynomial multiplications, additions, or subtractions in the quotient ring $$R_q = Z_q[x]/(f),$$

where the modulus q is an integer and the dimension (number of coefficients) is an integer n. A polynomial $a \in R_q$ can be represented as an array of values and a single value a[i] at an integer position i can be accessed. All major computations in lattice-based cryptosystems schemes may be performed on arrays of values modulo q.

For the quotient ring, operations like addition and multiplication can be defined. An addition c=a+b for a, b, $c \in R_q$ may be defined as $$c = \sum_{i=0}^{n-1}(a[i] + b[i] \bmod q) \cdot X^i$$

where i is an integer, q is an integer, a [i] is the i-th coefficient of a, b [i] is the i-th coefficient of b and X is the indeterminate. A subtraction c=a−b works in the same manner with "+" being replaced by "−".

The product c=a·b of polynomials a, b, $c \in R_q$ can also be computed. It is defined as a normal polynomial multiplication (sometimes also called "schoolbook" multiplication) followed by a reduction modulo the polynomial $f$ and a reduction modulo the integer q, i.e.

$$c = \left( \sum_{i=0}^{n-1} \sum_{j=0}^{n-1} a[i]b[j]x^{i+j} \bmod q \right) \bmod f.$$

The formula for polynomial multiplication can be simplified by considering the special rule that $x^n \equiv -1$ when $f = x^n + 1$ but similar polynomials may be used accordingly:

$$c = \sum_{i=0}^{n-1} \sum_{j=0}^{n-1} (-1)^{\lfloor \frac{i+j}{n} \rfloor} a[i]b[j]x^{i+j \bmod n} \bmod q$$

where i and j are integers, q is an integer, a[i] is the i-th coefficient of a, b[j] is the j-th coefficient of b and x is the indeterminate.

Sparse Multiplication

Some efficiency for polynomial arithmetic can be gained with algorithms that exploit specific properties of polynomials. As an example, a polynomial $s \in R_q$ may only have few coefficients that are non-zero, it may also only consist of coefficients that are either one or minus one, or it may in general have coefficients that are small. Also, it may exhibit a combination of such properties.

The Number Theoretic Transform (NTT)

An implementation following this formula would require $n^2$ modular multiplications and would thus be rather expensive.

Another approach for fast polynomial multiplication is the number theoretic transform (NTT). The NTT is basically a fast Fourier transformation (FFT) defined over a finite field or ring. Thus, all complex roots of unity of the FFT are exchanged for integer roots of unity and computations are carried out in the ring of integers modulo an integer q. A polynomial multiplication for a, b, $c \in R_q$ using NTT can be computed as $$c = a \cdot b = NTT^{-1}(NTT(a) \circ NTT(b))$$

where "∘" denotes a coefficient-wise multiplication, â=NTT(a) is the transformation of the polynomial a, b̂=NTT (b) is the transformation of the polynomial b, and $NTT^{-1}$( ) is the inverse transformation. The coefficient-wise multiplication ĉ=â∘b̂ for, â, b̂, ĉ∈$Z_q[x]$ can be defined as $$\hat{c} = \sum_{i=0}^{n-1} (\hat{a}[i] \cdot \hat{b}[i] \bmod q) \cdot X^i.$$

The advantage of the NTT is that a polynomial multiplication operation only requires roughly $n \log_2 n$ modular multiplications when an efficient algorithm is used and that a reduction modulo $$f = x^n + 1$$

(the so-called circular convolution property) or a reduction modulo $$f = x^n - 1$$

can be integrated into the NTT algorithm. Thus an n-point NTT is sufficient to work with n-coefficient polynomials.

To formally introduce the NTT, the choice of parameters may be restricted; also, the following may be set such that the NTT exists:

$$f = x^n + 1$$

and $q \equiv 1 \mod 2n$.

Further, a polynomial may be defined as follows $$g = \sum_{i=0}^{n-1} g[i]X^i \in R_q$$

such that $$NTT(g) = \hat{g} = \sum_{i=0}^{n-1} \hat{g}[i]X^i$$

with $$\hat{g}[i] = \sum_{j=0}^{n-1} \gamma^j g[i]\omega^{ij} \mod q,$$

where the integer $\omega$ is an 2n-th primitive root of unity modulo q and integer $\gamma = \sqrt{\omega} \mod q$. So $\gamma$ is a square root of $\omega$ modulo q.

The inverse transformation works similar. For a polynomial $\hat{g} \in R_q$ it can be defined as:

$$NTT^{-1}(\hat{g}) = g = \sum_{i=0}^{n-1} g[i]X^i$$

with $$g[i] = \left(n^{-1}\gamma^{-i}\sum_{j=0}^{n-1} \hat{g}[j]\omega^{-ij}\right) \mod q.$$

A straightforward computation of the NTT with the previously given definition has quadratic complexity and is not more efficient than the schoolbook approach. Thus, to realize fast polynomial multiplication using the convolution theorem, a fast algorithm to compute the NTT is required. This can be achieved via an implementation of the NTT with O(n log n) operations in $Z_q$, e.g., by the Cooley-Tukey radix-2 decimation-in-time (DIT) algorithm (see, e.g., https://en.wikipedia.org/wiki/Cooley%E2%80%93Tukey_FFT_algorithm) or by a decimation-in-frequency (DIF) algorithm. The DIT NTT algorithm recursively splits the computation into a sub-problem on the even inputs and a sub-problem on the odd inputs of the NTT.

Randomness and Random Sampling $a \xleftarrow{\$} S$ indicates an action of selecting the variable a independently and uniformly at random from some set S or a specific distribution S.

It is noted that "random" or "uniform" in this regard (e.g., selecting randomly or any random value) may be a true random, a pseudo-random or a deterministic approach to obtain a value. Hence, the property of such "randomness" or any random effect according to the proposal provided herewith may be that an attacker is unaware of the value and that values are different for at least a portion of operations. The randomness in particular adds a certain level of entropy between values that are "randomly" determined, e.g., generated and/or selected.

For a finite set S, a uniform distribution on the set S may be referred to as U(S). The notation $a \xleftarrow{\$} U(R_{q,k})$ may indicate a uniformly random sampling of $a \in R_q$ where all coefficients of a are [-k, k].

For a probability distribution $\chi$ on R it is assumed that an efficient sampling is feasible and the notation $a \xleftarrow{\$} \chi$ is used to denote the random sampling of $a \in R$ from the probability distribution $\chi$.

The sampling of secret noise or error vectors is a basic task in lattice-based public-key encryption (PKE), key exchange, or signature schemes. A particular attribute of such noise or error vectors is that they are usually small (i.e., with coefficients that are close to zero).

A discrete Gaussian distribution $D_{Z,\sigma}$ with mean 0 and standard deviation $\sigma > 0$ over the integers associates a probability $\rho_\sigma(x)/\rho_\sigma(Z)$ to $x \in Z$ for $$\rho_\sigma(x) = \exp\left(\frac{-x^2}{2\sigma^2}\right)$$

and $\rho_\sigma(Z) = 1 + \Sigma_{i=1}^{\infty} \rho_\sigma(i)$.

Thus $a \xleftarrow{\$} D_{Z,\sigma}$ denotes a process of randomly sampling a value $d \in Z$ according to the discrete Gaussian distribution $D_{Z,\sigma}$ and $a \xleftarrow{\$} D_{Z,\sigma}^n$ indicates a process of randomly sampling of a polynomial $a \in R_q$ of dimension n where coefficients are independent and distributed according to the discrete Gaussian distribution $D_{Z,\sigma}$.

A sampler that produces values according to a discrete Gaussian distribution can be realized using the cumulative distribution function (CDF) or a cumulative distribution table (CDT) or with (e.g., high-precision) computations.

The execution of a cryptographic scheme usually requires 512 to 4096 samples from the noise or error distribution for each cryptographic operation.

An exemplary distribution that can be used for sampling purposes is the binomial distribution $\psi_k$. A sample from this binomial distribution $\psi_k$ may be generated by computing $$\sum_{i=0}^{k-1} b_i - b_i',$$

wherein $b_i, b_i' \in \{0,1\}$ are random bits.

Thus, $a \xleftarrow{\$} \psi_k$ denotes a process of randomly sampling a value $d \in Z$ according to the binomial distribution $\psi_k$.

Further, $a \xleftarrow{\$} \psi_k^n$ denotes a process of randomly sampling a polynomial $a \in R_q$ of a dimension n, wherein coefficients are independent and distributed according to the binomial distribution $\psi_k$.

The standard deviation of the binomial distribution is $\sqrt{k/2}$ and the variance amounts to k/2. An alternative approach to sample from the binomial distribution $\psi_k$ is to compute $$\left(\sum_{i=0}^{2k-1} b_i\right) - k$$

with $b_i \in \{0,1\}$ being random bits.

A sampler of the binomial distribution may be implemented according to [NewHopePaperEprint16]. One example is to obtain two random bitstrings $v_1$, $v_2$ each of length k, to compute integer Hamming weights $h_1=HW(v_1)$ and $h_2=HW(v_2)$, and subsequently determine $h_1-h_2$ as an output of such sampler.

Notation, Additional Remarks

Basic operations in ideal lattice-based_cryptography are polynomial multiplications, additions, or subtractions in the quotient ring $R_q=Z_q[x]/(f)$, wherein the modulus q is an integer and the dimension (number of coefficients) is an integer n.

$a \leftarrow^\$ U(R_{q,k})$ denotes the uniformly random sampling of the variable $a \in R_q$, wherein the coefficients of the variable a are of the interval [−k, k].

$a \leftarrow^\$ \chi^n$ indicates the random sampling of the variable $a \in R_q$, wherein the coefficients are independent and follow the probability distribution $\chi$. An exemplary instantiation of the probability distribution $\chi$ may be the discrete Gaussian distribution $D_{Z,\sigma}$.

A function $s=\mathrm{SAMPLE}_\chi(\mathrm{seed}, \mathrm{nonce})$ outputs a polynomial s distributed according to the probability distribution $\chi$, wherein the coefficients of the polynomial s depend deterministically on the variables seed and nonce.

The value nonce can be interpreted as a so-called domain separator so that the function $\mathrm{SAMPLE}_\chi$ can be used with the same value seed to generate different polynomials. According to an example, the value seed is a secret and the value nonce is publicly known. As an option, the value nonce may also be regarded as a secret.

Also, a one-way-function (e.g., a hash function) is part of this function and thus applied to the variables seed and nonce before the value is used to generate pseudorandom bits that are used to sample from the probability distribution $\chi$. An instantiation could be according to Algorithm 4 as described in https://newhopecrypto.org/data/NewHope_2019_07_10.pdf.

$h=\mathrm{HASH}(v)$ is defined as a cryptographic hash function with a polynomial $v \in R_q$ as input and a binary hash h as output. Examples for hash function are SHA-2 or SHA-3 hash functions. Multiple elements may be input to a cryptographic hash function. For example, a notation HASH(a, b, c) or HASH(a||b||c) can be used to indicate that elements a, b and c are input to the hash function HASH.

The absolute sum of the variable $a \in R_q$ is defined as $\|a\|$, wherein the absolute sum is applied to each individual coefficient of the variable a.

The expression $\|a\| < \beta$ is true if the absolute sum of each coefficient of a is smaller than an integer $\beta$.

Exemplary Implementation

Figure 1:
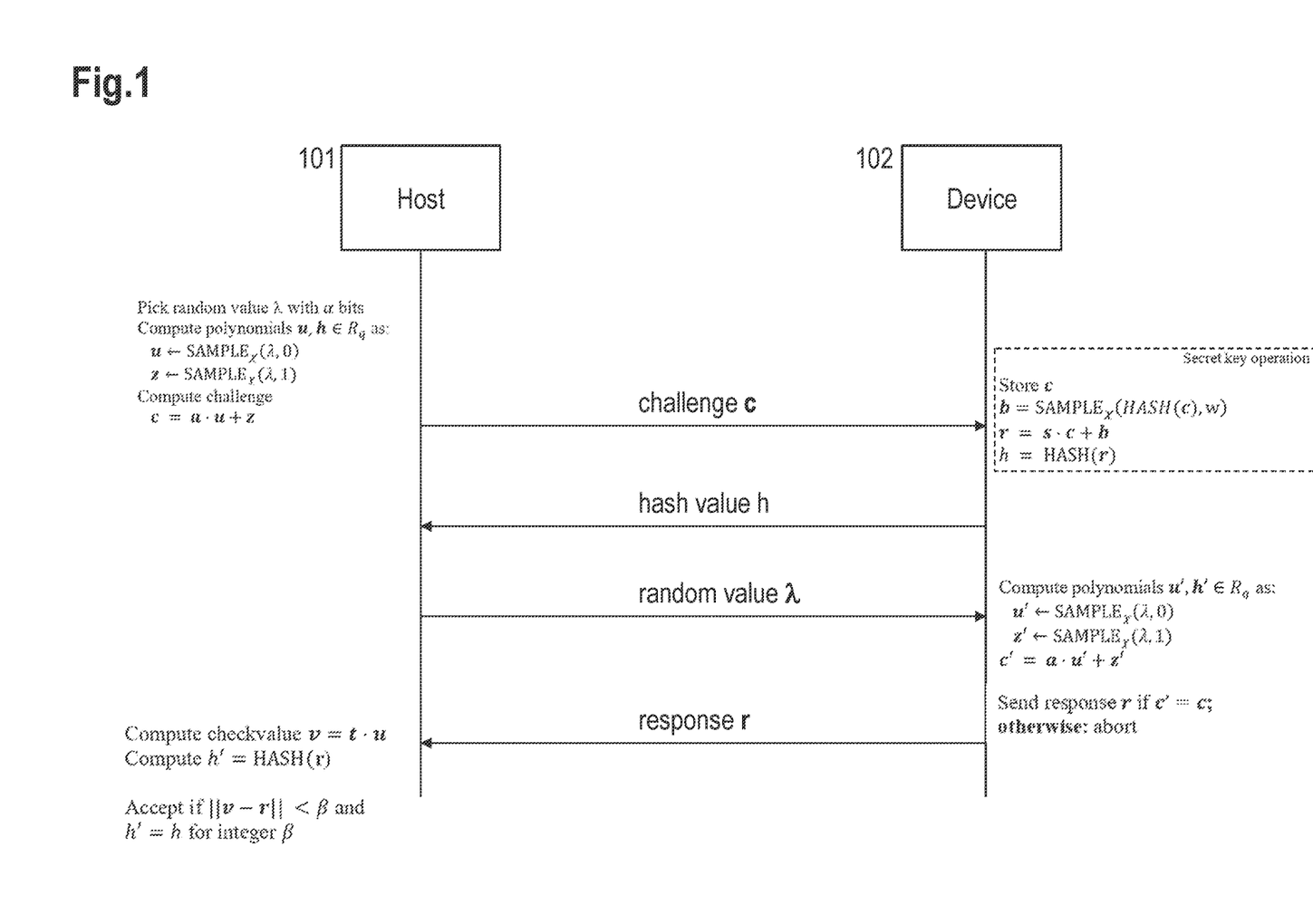
FIG. 1 a basic diagram illustrating a communication (protocol) between a host and a device, wherein the device may in particular be a consumable or an electronic device attached to a consumable.

FIG. 1 shows a basic diagram illustrating a communication (protocol) between a host and a device, wherein the device may in particular be a consumable or an electronic device attached to a consumable. The communication protocol may in particular be used to authenticate the device to the host or—in other words—that the device shows to the host that it knows the secret key that is associated with the public key used by the host.

During a setup, a fix uniformly random global constant a is generated:

$$a \leftarrow^\$ U(R_{q,k})$$

Further, a key generation is conducted as follows:
Polynomials s, $e \leftarrow^\$ \chi^n$ are determined.

A random number $\alpha$ is picked to determine a number of bits for a value w.

A private key $s \in R_q$ and the value w are determined. Both are regarded as secret.

A public key t is determined as $$t = a \cdot s + e \in R_q.$$

FIG. 1 shows a communication between a host 101 and a device 102. The host 101 has the public key $t \in R_q$ and the device 102 has the private key $s \in R_q$ as well as the secret value w, which is $\alpha$ bits long. The secret key s and the secret value w are secrets that usually remain with the device 102 and are not shared with an entity outside of the device 102.

The host 101 may pick a random value $\lambda$ of $\alpha$ bits length. The random value $\lambda$ is also referred to as randomness or seed.

Further, the host determines polynomials u, $z \in R_q$ as follows:

$$u \leftarrow \mathrm{SAMPLE}_\chi(\lambda, 0)$$

$$z \leftarrow \mathrm{SAMPLE}_\chi(\lambda, 1)$$

A challenge c is then computed as $$c = a \cdot u + z$$

The challenge c is sent from the host 101 to the device 102.

The device 102 may store the challenge c received and compute an intermediate result b as $$b = \mathrm{SAMPLE}_\chi(\mathrm{HASH}(c), w).$$

A response r is determined as $$r = s \cdot c + b,$$

based on the intermediate result b, the secret key s and the challenge c.

Next, a hash value h is determined as an auxiliary value based on the response r:

$$h = \mathrm{HASH}(r).$$

The hash value h is sent as auxiliary value from the device 102 to the host 101.

It is noted that storing the challenge s, computing the response r and the hash value h may be the only secret key operations conducted by the device 102.

The host 101 stores the hash value h and sends the random value $\lambda$ to the device 102.

Then, the device 102 determines polynomials u', $z' \in R_q$ as $$u' \leftarrow \mathrm{SAMPLE}_\chi(\lambda, 0)$$

$$z' \leftarrow \mathrm{SAMPLE}_\chi(\lambda, 1)$$

and a challenge c' as $$c' = a \cdot u' + z'.$$

The response r is then sent from the device 102 to the host 101 only if the challenge c' determined locally at the device 102 corresponds to the challenge c obtained from the host 101, e.g., if $$c' = c.$$

Otherwise, a predefined action, e.g., abort, alarm and/or notification is triggered.

If the host 101 receives the response r, a checkvalue v is determined based on the public key t and the previously determined polynomial u:

$$v = t \cdot u.$$

Next, the host 101 determines a hash value h' based on the response r:

$$h' = \text{HASH}(r).$$

If $$\|v-r\| < \beta$$

and if $$h' = h$$

applies for the integer β, the response r is accepted by the host 101. In this case, the device 102 has been successfully authenticated to the host 101.

The protocol provided works because the following equations apply:

$$v = t \cdot u = (a \cdot s + e) \cdot u = asu + eu;$$

$$r = sc + b = c \cdot (a \cdot u + z) + b = asu + zs + b.$$

The difference between v and r is $$v - r = eu - zs - b.$$

The term $$eu - zs - b$$

contains only polynomials which are taken from a small distribution $\chi''$.

With appropriate parameters, e.g., n=256, q=7681 and $\chi''$ being a discrete Gaussian or binomial distribution with standard deviation of roughly $$\sigma = 3,$$

a number of bits $$\alpha = 128$$

and a boundary $$\beta = 500$$

can be determined.

Also, the protocol can be modified so that a few coefficients are accepted that are larger than the boundary β.

Security

If the challenge c follows a uniformly random distribution, the response r is an RLWE sample. Therefore, an attacker has to break RWLE in order to obtain the secret key s from the response r.

The public key $t = a \cdot s + e \in R_q$ is also an RLWE sample and the attacker has to break RWLE in order to obtain the secret key s from the public key t.

It may, however, not be trivial to ensure that the challenge c follows a uniformly random distribution. Without the solution described herein, the attacker may send a challenge $$c = [0,0,0,0, \ldots, 1]$$

and obtain in return the response $$r = s + b,$$

which would allow the attacker to determine the secret key s after a small number of trials.

Examples of the approach described herein require the host 101 to generate the value of the challenge c in an "honest" way. By using the function $$\text{SAMPLE}_\chi(\text{seed,nonce}),$$

the host 101 does not have any control over the actual values λ that lead to different sampled polynomials u and z, which further influence the value of the challenge c.

Hence, the host 101 can only try various seed values but as the seeds are subject to a one-way function (e.g., a hash function), the output of $\text{SAMPLE}_\chi$ is pseudorandom leading to the challenge c being rather arbitrary.

In order to launch a promising attack, the host 101 may try to cheat by directly picking a value of the challenge c. However, this is detected later when the host 101 needs to reveal the value of the seed λ, which should have been used to generate the polynomials u and z. Based on the random value λ, the device 102 is able to verify whether the challenge c was honestly generated: The device 102 conducts the sampling steps that should also have been used by the host 101 and based on the result of the sampling steps determines the challenge c' which can be compared to the challenge c obtained from the host 101.

On the other hand, the device 102 obtains the challenge c and commits to the response r by sending out the hash-value h (without having to check the challenge c at that time).

Next, the host 101 may release the seed λ that was used to generate the polynomials u and z on which the challenge c is based.

Beneficially the device 102 commits to a response r with the hash value h. It is noted that the hash function is only an exemplary function. Any one-way function may be used.

The device 102 does not release the response r to the host 101, before the device 102 has ensured that the challenge c obtained from the host 101 is valid (i.e., honestly generated according to the protocol).

Finally, the host 101 can check the validity of the device 102 by testing that coefficients of $$\|v-r\|$$

are smaller than a predefined integer threshold β.

Only a valid device 102 knows the secret key $s \in R_q$ and only with a correct secret key the absolute value $\|v-r\|$ will be small and the term asu will get cancelled out.

Alternative Embodiment: Authentication of Data

Figure 2:
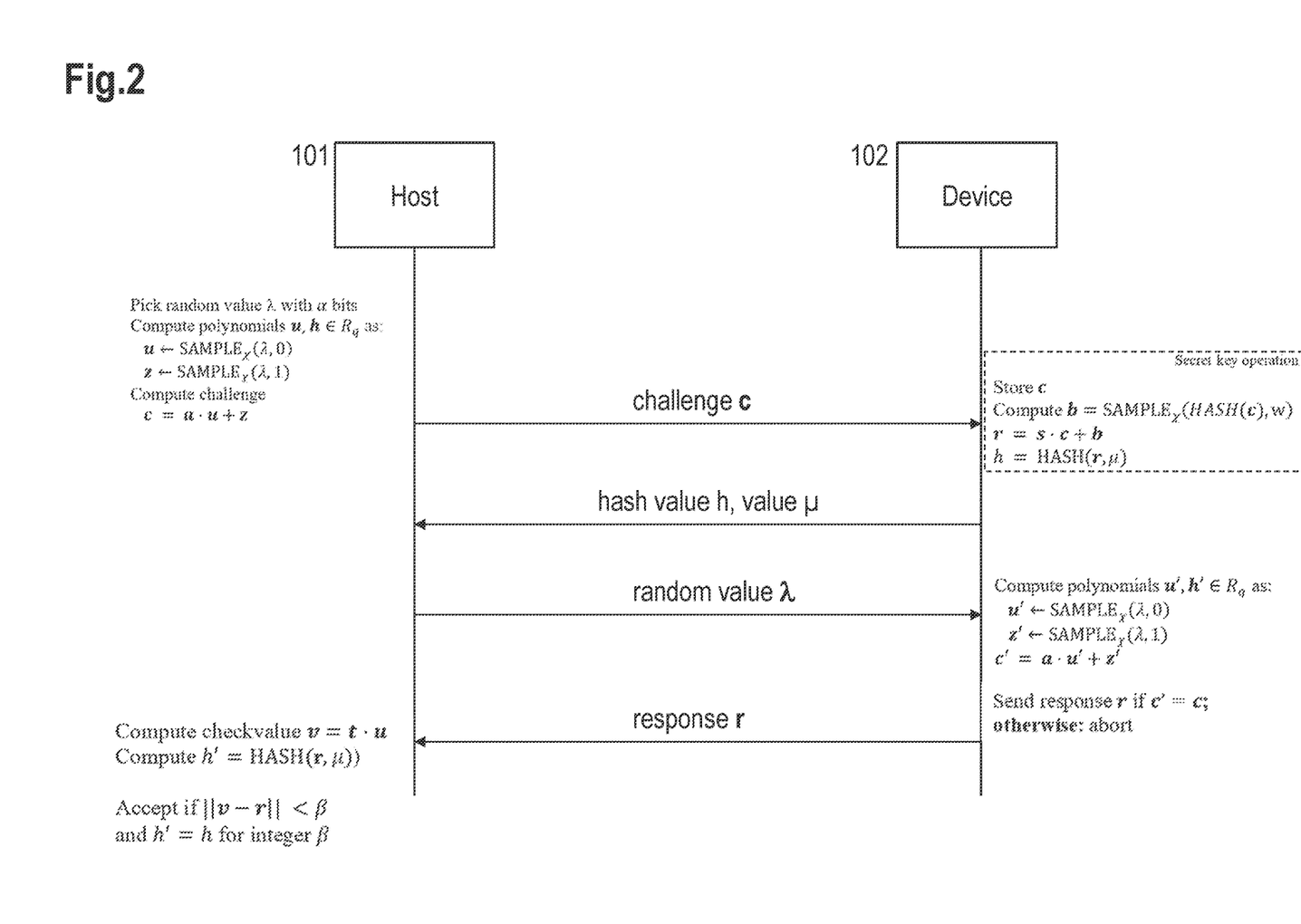
FIG. 2 shows an alternative embodiment to FIG. 1, wherein an additional value μ is part of the communication.

FIG. 2 shows an alternative embodiment visualizing an interactive signature protocol. The diagram of FIG. 2 is based on FIG. 1. In contrast to FIG. 1, the device 102 of FIG. 2 considers a value μ.

The value μ may be a single value, a multitude of values, information or data. This value μ is used in the secret key operation conducted at the device 102.

The value μ may be information that is known to both parties. By performing the secret-key related operation on the value μ, the device 102 can interactively sign the value μ with its secret key. This may ensure to the host 101 that a particular information is present at the device 102, e.g., after transmission, or that a certain state is correct and accepted by the device 102. Moreover, the value μ may be a hash value of data exchanged according to another cryptographic protocol, e.g., an ephemeral key exchange. The device 102 may then use the protocol described herein to authenticate itself to the host 101 and to show what data has been exchanged in the previous cryptographic protocol. This allows the host detecting a man-in-the-middle attack.

FIG. 2 shows an exemplary use case with the value μ being transferred to the host 101 and the host 101 being able to (further) process the value μ.

The host 101 is able to authenticate the value μ. The value μ may be an internal counter (e.g., ink counter) or any state information. By including the value μ in the function HASH (r, μ), a manipulation of the value μ during the transmission from device 102 to host 101 could be detected. Hence, the device 101 is able to proof its possession of a secret key and a value of, e.g., an internal counter to the host 101.

As is shown in FIG. 2, the device 102 determines the hash value h based on the value µ and the response r:

$$h = \text{HASH}(r, \mu).$$

The device 102 then provides the hash value h and the value µ to the host 101. The host 101 stores the hash value h and the value µ.

After the host 101 has received the response r (as described above with regard to FIG. 1), the host 101 computes the hash value h' based on the response r and the value µ:

$$h' = \text{HASH}(r, \mu).$$

If $$\|v - r\| < \beta$$

and if $$h' = h$$

applies for the integer β, the response r is accepted by the host 101, hence the device 102 has been successfully authenticated to the host 101.

It is, however, an option that the value µ is communicated separately, e.g., out of band, before and/or after completion of the protocol. Advantageously, the device 102 may incorporate the value µ, which may or may not be a secret, into the hash value h or into any value that is used to derive the hash value h. Hence, the host 101 is provided with proof that the value µ was known to the device 102 or was stored at the device 102 at a certain point in time, e.g., when the hash value h has been calculated.

The value µ may be a counter or status or any kind of information. The value µ may also be supplied by the host 101. It is in particular an option that the value µ is generated by the host 101 and then conveyed to the device 102.

Alternative Embodiment

Figure 3:
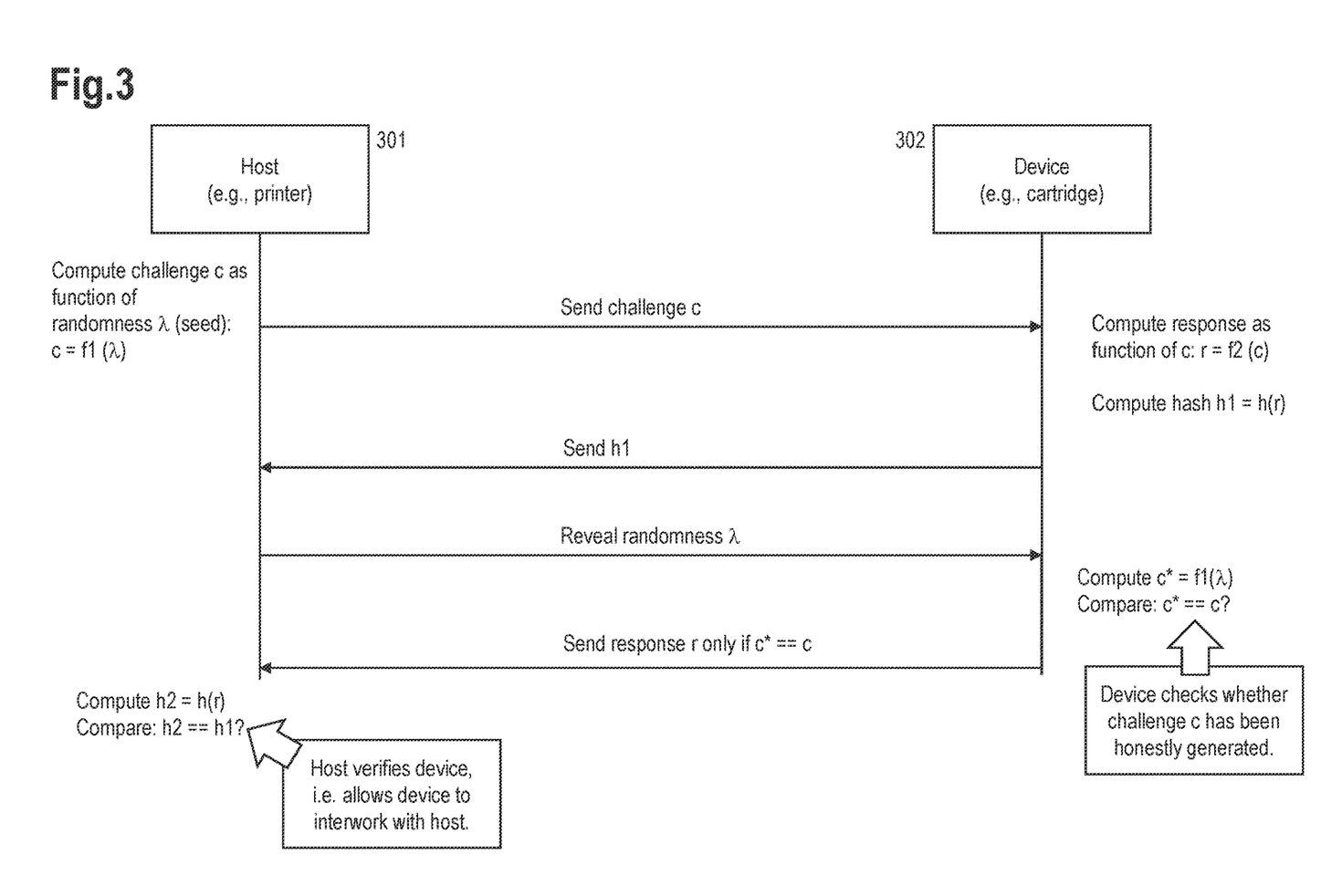
FIG. 3 shows yet an alternative embodiment that is not limited to post-quantum cryptography.

FIG. 3 summarizes the principle of the mutual authentication in a general way beyond Lattice cryptography. A host 301 communicates with a device 302. The host 301 may be a printer and the device may be a cartridge 302 ("consumable"). Other examples for hosts and devices are shown below.

The host 301 computes a challenge c as function f1 of a random value λ:

$$c = f1(\lambda).$$

The random value λ may be a true random value, a pseudo random value, a value calculated on a deterministic algorithm or a predefined value. Also, any of the above may be used (in part) to determine the random value λ.

The host 301 conveys the challenge c to the device 302.

The device computes a response as a function f2 of the challenge c:

$$r = f2(c).$$

Also, the device 302 uses a hash function h to determine a hash value h1 as an auxiliary value based on the response r:

$$h1 = h(r).$$

The device 302 sends the hash as auxiliary value h1 to the host 301.

The host 301 receives the hash value h1 and in return sends the random value λ to the device 302.

Upon receiving the random value λ, the device 302 computes a challenge c* based on the random value λ using the function f1:

$$c^* = f1(\lambda).$$

The device 302 may then compare the challenge c* calculated locally with the challenge c obtained from the host 301. The device 302 may thus determine whether or not the challenge c has been honestly generated. One example to achieve this is to determine whether the challenge c and c* are the same.

If the challenge c has been honestly generated, the device 302 conveys the response r to the host 301.

Based on the response r obtained from the device 302, the host 301 uses the hash function h to compute a hash value h2 based on the response r:

$$h2 = h(r).$$

If the hash value h2 corresponds to the hash value h1, the host 301 is able to verify the device 302 and may then allow utilization of the device 302.

If the host 301 is a printer and the device 302 is a cartridge with toner or ink, the printer may only utilize the cartridge if this verification was successful. Otherwise, an invalid device is detected and the printer may refuse to work with this invalid cartridge.

It is noted that each of the functions f1 and f2 indicated above may be or comprise at least one of the following: a collision-resistant hash function, a secure-preimage resistant hash function, a pseudo random function or a one-way function.

Further Advantages, Embodiments and Implementations

It is noted that computation described herein may be accelerated by using a product form of the polynomials.

It is noted that variations of the protocol may be used to increase its robustness against attacks.

For example, in order to increase the level of protection, the device my sample a secret random value k and compute a hash value $$h = \text{HASH}(r, k)$$

wherein the binary representation of the response r is concatenated via the ","-operator with the secret random value k. After checking the validity of the challenge c, the device may release the response r and the secret random value k. The host may then check that $$h' = \text{HASH}(r, k) = h.$$

The use of the secret random value k combined with the response r increases the difficulty for an attacker to extract information out of the hash value h, because of the added unpredictability based on the secret random value k. Also, the secret random value k is only released after the validity of the challenge has been confirmed.

The secret random value k may be used in combination with the value µ leading to a hash value $$h = \text{HASH}(r, \mu, k),$$

which may be verified accordingly.

The intermediate result b (which may favorably also be a secret value) can be computed as stated above $$b = \text{SAMPLE}_\chi(\text{HASH}(c), w)$$

or by including the value w into the hash function $b = \text{SAMPLE}_\chi(\text{HASH}(c,w),0).$ As an option, the value w may be a publicly known constant. It is also an option that the computation of the intermediate result b is based on a randomly chosen value β:

$b = \text{SAMPLE}_\chi(\beta,0).$

It is also an option that the computing performance is increased by using the so-called Learning with Rounding assumption. The learning with rounding (LWR) principle can be applied by replacing random errors (i.e., the intermediate result b) with deterministic rounding. Security is achieved not by adding noise/error vectors (e.g., the intermediate result b), but by releasing a deterministically rounded value.

Thus, based on $b = \text{SAMPLE}_\chi(\text{HASH}(c),w).$ the device may replace the computation of $r = s \cdot c + b,$ $h = \text{HASH}(r)$ by $r = \lfloor s \cdot c \rceil_p$ $h = \text{HASH}(r).$ In this context the $\lfloor \bullet \rceil_p$ indicates an operation (i.e. the rounding function) that is defined for an integer p<q and an integer v with $$\lfloor v \rceil_p = \left\lfloor \left(\frac{p}{q}\right) \cdot v \right\rceil$$

wherein $\lfloor \bullet \rceil$ denotes the closest integer. The rounding function can be applied component-wise to vectors, polynomials or matrices. Hence, the coefficients are deterministically rounded.

In case p and q are both powers of 2, the rounding function leads to outputting log(p) most significant bits of v. The learning with rounding principle may be applied in other parts of the protocol as well, e.g., the operation $c = a \cdot u + z$ may be replaced by $c = \lfloor a \cdot u \rceil_p$ with and update of the check function where the device computes $c' = \lfloor a \cdot u' \rceil_p.$ The protocol may in particular be instantiated over learning with rounding, module learning with rounding, ring learning with rounding, ring learning with errors, learning with errors, or module learning with errors or NTRU rings.

The value of the global constant a can be part of the public key and thus be generated individually for each device. The efficiency or security of the parameters may be increased by optimizing the check $\|v - r\| < \beta.$ The host may, for example, also accept a certain number η of coefficients that are larger or equal than β. If this number η of coefficients is small (i.e. small in comparison to the dimension n; an exemplary value for η may be 16), the security of the protocol may still be sufficient.

In an exemplary implementation the device is a small piece of hardware (compared to the size and/or complexity of the host). It is also an option that the device computes the response based on hardware with data-paths being shared and/or randomized.

The response r may be restricted to a selection of bits, in particular to higher-order bits. This restriction may apply to the response r as well as to the hash value h determined based on the response r.

The NTT may be used and a secured pointwise multiplication may be conducted by the device.

The device or the host may be a crypto engine or comprise a crypto engine.

The crypto-engine may be part of a hardware unit like a controller or it may be a hardware unit on its own, to supply a cryptographic information. This cryptographic information may be, e.g., a signature.

The crypto engine may be a cryptographic engine capable of conducting at least one cryptographic operation.

The crypto engine may be a chip or part of a chip. The crypto engine may be attached to a so-called "consumable" that provides, e.g., a signature to another entity, also referred to as an outside entity.

In an exemplary use-case scenario, the consumable may be the device (realized as or comprising a crypto-engine) and the outside entity is the host as described above.

The consumable may provide something for the host "to consume". There exist many examples for combinations of consumable and host, e.g.:
  printing cartridge—printer;
  battery—device using the battery;
  refill cartridge—electronic cigarette;
  credit balance card—prepaid handy;
  coffee capsule—coffee maker;
  filter cartridge—water filter;
  medical supply—medical device.

The consumable may be physically connected to the host. The host may be configured to authenticate the consumable and the host may be further configured to utilize the consumable only in case of a successful authentication.

It may also be an option that the crypto engine is attached to or part of a device, wherein such device uses the crypto engine for authentication purposes with, e.g., a cloud or a network.

Hence, the host may authenticate the consumable (i.e. the device) using the protocol described herein. As an option, the authenticity of the public key may be checked in advance via a digital certificate.

The secret key operations conducted by the device can be performed in software, hardware or a combination of both. The software may at least in part be stored in an embedded secure element or in a specialized hardware module.

The authentication mechanism described herein may in particular utilize a certain distribution to enable security. It is avoided that an attacker breaks the solution described by taking a challenge of his choice and obtain an appropriate response from the device. Instead, such challenge does not fulfill the requirement of the mechanism described herein and the attacker would thus not receive the correct response or the attacker would receive no response at all. This is achieved by the device
 (i) committing to the hash of the response and
 (ii) sending the response only if the validity of challenge has been verified.

Further Implementation Examples

Figure 4:
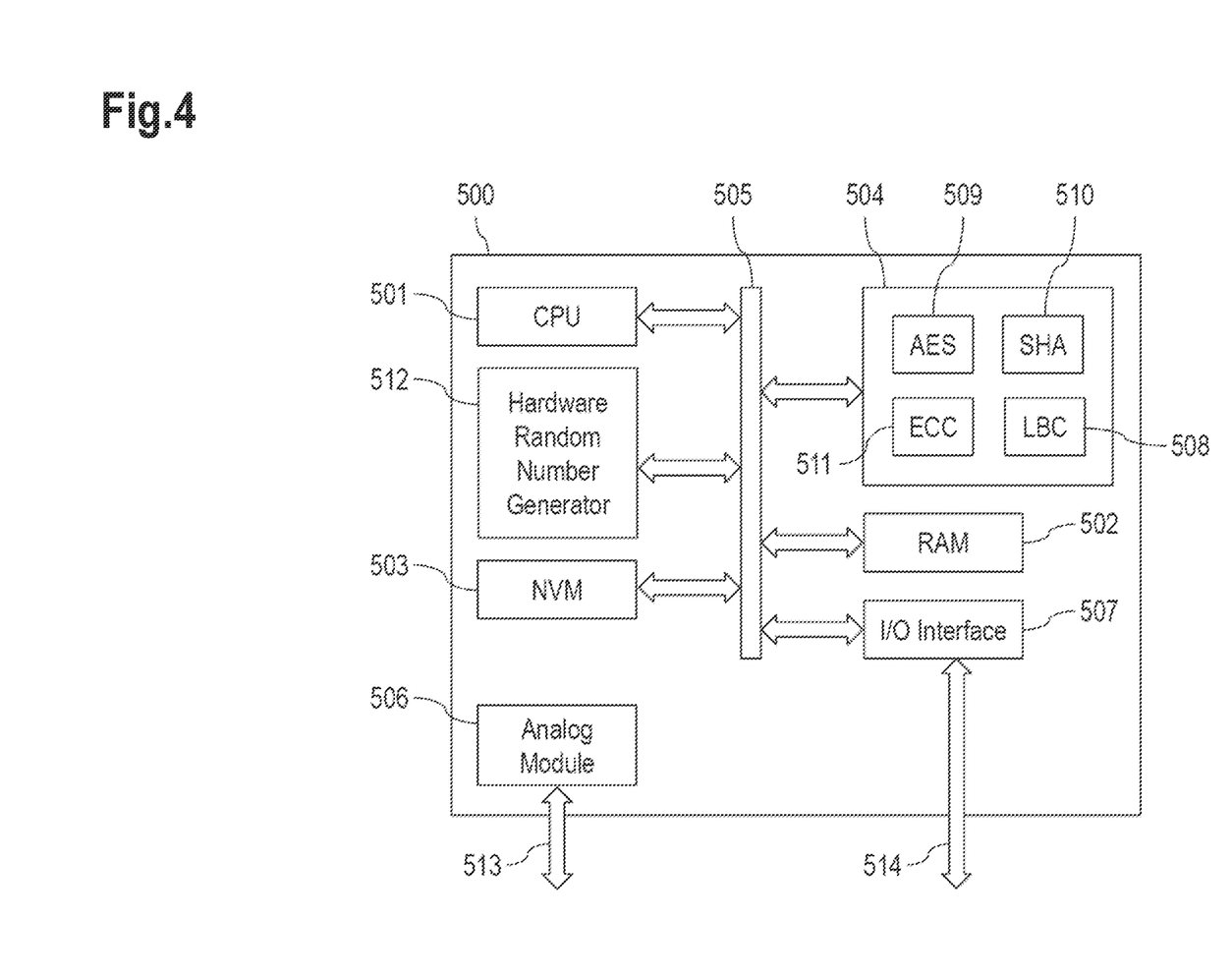
FIG. 4 shows an exemplary arrangement of a processing device comprising a CPU, a RAM, a non-volatile memory, a crypto module, an analog module, an input/output interface and a hardware-random number generator.

FIG. 4 shows a processing device 500 comprising a CPU 501, a RAM 502, a non-volatile memory 503 (NVM), a crypto module 504, an analog module 506, an input/output interface 507 and a hardware-random number generator 512.

In this example, the CPU 501 has access to at least one crypto module 504 over a shared bus 505 to which each crypto module 504 is coupled. Each crypto module 504 may in particular comprise one or more crypto cores to perform certain cryptographic operations. Exemplary crypto cores are:

- an AES core 509,
- a SHA core 510,
- an ECC core 511, and
- a lattice-based crypto (LBC) core 508.

The lattice-based crypto core 508 may be provided in order to conduct or accelerate lattice-based cryptography.

The CPU 501, the hardware random number generator 512, the NVM 503, the crypto module 504, the RAM 502 and the input/output interface 507 are connected to the bus 505. The input output interface 507 may have a connection 514 to other devices, which may be similar to the processing device 500.

The crypto module 504 may or may not be equipped with hardware-based security features. As an option, the crypto module 504 may comprise a random number generator.

The analog module 506 is supplied with electrical power 513 via an electrical contact and/or via an electromagnetic field. This power is supplied to drive the circuitry of the processing device 500 and may in particular allow the input/output interface to initiate and/or maintain connections to other devices via the connection 514.

The bus 505 itself may be masked or plain. Instructions to process the steps described herein may in particular be stored in the NVM 503 and processed by the CPU 501. The data processed may be stored in the NVM 503 or in the RAM 502. Supporting functions may be provided by the crypto modules 504 (e.g., expansion of pseudo random data). Random numbers may be supplied by the hardware-random number generator 512.

Steps of the method described herein may exclusively or at least partially be conducted on the crypto module 504. For example, instructions may be stored in the lattice-based crypto core 508 or they may be provided by the CPU 501 via the bus 505. Data may be stored locally with any of the crypto cores 508 to 511. It is also an option that the data is temporarily stored in the RAM 502 or the NVM 503. The lattice-based crypto core 508 may also use other crypto modules to provide supporting functions (e.g., expansion of pseudo random data). The lattice-based crypto core 508 may also comprise a hardware-random number generator or a means to generate physical and/or software random numbers.

The processing device 500 may be a chip card powered by direct electrical contact or through an electro-magnetic field. The processing device 500 may be a fixed circuit or based on reconfigurable hardware (e.g., Field Programmable Gate Array, FPGA). The processing device 500 may be coupled to a personal computer, microcontroller, FPGA or a smart phone.

Figure 5:
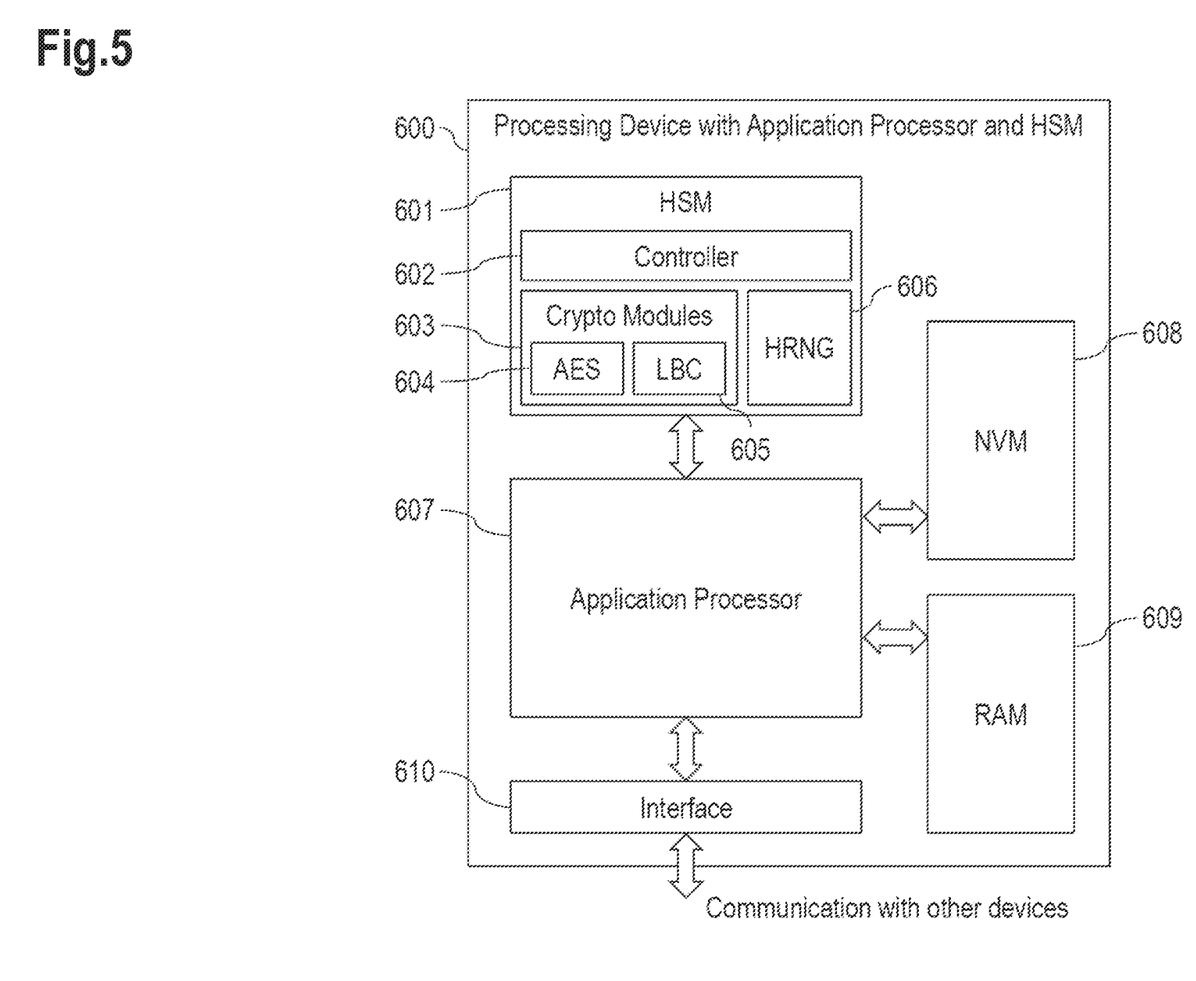
FIG. 5 shows an alternative arrangement with a hardware security module (HSM).

FIG. 5 shows another example of a processing device 600. The processing device 600 comprises a hardware security module 601, a non-volatile memory (NVM) 608, a random access memory (RAM) 609, an interface 610 for communication with other devices and an application processor 607, which is coupled with the hardware security module (HSM) 601, the RAM 609, the NVM 608 and the interface 610.

The HSM 601 comprises a controller 602, a hardware-random number generator (HRNG) 606 and at least one crypto module 603. The crypto module 603 exemplarily comprises an AES core 604 and a Lattice-based crypto (LBC) core 605.

According to one embodiment, the HSM 601 and the application processor 607 may be fabricated on the same physical chip with a tight coupling. The HSM 601 delivers cryptographic services and secured key storage while the application processor may perform computationally intensive tasks (e.g., image recognition, communication, motor control). The HSM 601 may be only accessible by a defined interface and considered independent of the rest of the system in a way that a security compromise of the application processor 607 has only limited impact on the security of the HSM 601. The HSM 601 may perform all tasks or a subset of tasks described with respect to the processing device 600 by using the controller 602, the LBC 605, supported by, exemplary, an AES 604 and the HRNG 606. It may execute the procedures described herein (at least partially) either controlled by an internal controller or as CMOS circuit. Moreover, also the application processor 607 may perform the procedures described herein (at least partially, e.g., in collaboration with the HSM 601).

The processing device 600 with this application processor 607 and HSM 601 may be used as a central communication gateway or (electric) motor control unit in cars or other vehicles.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

LIST OF REFERENCES

[NewHopeNist17] NewHope—Submission to the NIST post-quantum project. Erdem Alkim, Roberto Avanzi, Joppe Bos, Leo Ducas, Antonio de la Piedra, Thomas Poppelmann, Peter Schwabe, Douglas Stebila. See https://csrc.nist.gov/Projects/Post-Quantum-Cryptography/Round-1-Submissions

[NewHopeSimplePaperEprint16] Erdem Alkim, Leo Ducas, Thomas Poppelmann, Peter Schwabe: NewHope without reconciliation. IACR Cryptology ePrint Archive 2016: 1157 (2016).

[NewHopePaperEprint16] Erdem Alkim, Léo Ducas, Thomas Pöppelmann, Peter Schwabe: Post-quantum key exchange—a new hope. IACR Cryptology ePrint Archive 2015: 1092 (2015)

[OSPG18] T. Oder, T. Schneider, T. Poppelmann and T. Guneysu: Practical CCA2-Secure and Masked Ring-LWE Implementation, IACR Eprint, 23 Jan. 2018 (accessed 15 Jun. 2018), https://eprint.iacr.org/2016/1109.pdf

[LPR10A] Vadim Lyubashevsky, Chris Peikert, Oded Regev.: On Ideal Lattices and Learning with Errors Over Rings, Journal of the ACM, 60(6):43:1-43:35. Preliminary version in Eurocrypt 2010. https://web.eecs.umich.edu/~cpeikert/pubs/ideal-lwe.pdf

[LPR10B] Vadim Lyubashevsky, Chris Peikert, Oded Regev.: On Ideal Lattices and Learning with Errors Over Rings, Slides presented at Eurocrypt 2010, https://web.eecs.umich.edu/~cpeikert/pubs/slides-ideal-lwe.pdf

What is claimed is:

1. A method for providing a response comprising:
obtaining a challenge from a host,
determining the response based on the challenge,
determining an auxiliary value based on the response or the challenge,
providing the auxiliary value to the host,
obtaining a random value from the host,
checking the validity of the challenge based on the random value, and
providing the response to the host only if the challenge is valid.

2. The method according to claim 1, wherein the response is configured such that the host is able to verify the validity of the originator.

3. The method according to claim 1, wherein determining the response and checking the validity of the challenge each utilize at least one cryptographic Lattice operation.

4. The method according to claim 1, wherein the response is determined based on at least cryptographic operation.

5. The method according to claim 1, wherein the auxiliary value is determined using a one-way function.

6. The method according to claim 1, wherein the auxiliary value is determined based on an additional value ($\mu$) and wherein the additional value ($\mu$) is conveyed to the host.

7. The method according to claim 1, wherein the method is used on a security device or for operating a security device, wherein such security device comprises at least one of the following:
an integrated circuit,
a hardware security module,
a trusted platform module,
a crypto unit,
a FPGA,
a processing unit,
a controller,
a smartcard.

8. A method for authenticating a device to a host comprising:
at the host, determining a challenge based on a random value and providing the challenge to the device;
at the device, obtaining the challenge from the host, determining a response based on the challenge, determining an auxiliary value based on the response or the challenge, and providing the auxiliary value to the host;
at the host, obtaining the auxiliary value from the device, providing the random value to the device;
at the device, obtaining the random value from the host, checking the validity of the challenge based on the random value, providing the response to the host only if the challenge is valid; and at the host, obtaining a response from the device and authenticating the device if the response corresponds to the auxiliary value.

9. A security device comprising:

interface circuitry; and processing circuitry operatively connected to the interface circuitry and configured to:
  obtain a challenge from a host, via the interface circuitry,
  determine the response based on the challenge,
  determine an auxiliary value based on the response or the challenge,
  provide the auxiliary value to the host, via the interface circuitry,
  obtain a random value from the host, via the interface circuitry,
  check the validity of the challenge based on the random value, and
  provide the response to the host only if the challenge is valid.

* * * * *